United States Patent
Wen

(10) Patent No.: US 9,170,724 B2
(45) Date of Patent: Oct. 27, 2015

(54) CONTROL AND DISPLAY SYSTEM

(71) Applicant: Jet-Optoelectrronics Co., LTD, Taipei (TW)

(72) Inventor: Michael Tai-Hao Wen, Taipei (TW)

(73) Assignee: JET OPTOELECTRONICS CO., LTD., Taipei (TW)

(*) Notice: Subject to any disclaimer, the term of this patent is extended or adjusted under 35 U.S.C. 154(b) by 229 days.

(21) Appl. No.: 13/854,136

(22) Filed: Apr. 1, 2013

(65) Prior Publication Data

US 2014/0298212 A1    Oct. 2, 2014

(51) Int. Cl.
| | |
|---|---|
| G06K 9/00 | (2006.01) |
| G06F 3/0484 | (2013.01) |
| G02B 27/01 | (2006.01) |
| G06F 3/01 | (2006.01) |
| B60K 35/00 | (2006.01) |

(52) U.S. Cl.
CPC ............ *G06F 3/04847* (2013.01); *B60K 35/00* (2013.01); *G02B 27/01* (2013.01); *G06F 3/017* (2013.01); *G02B 2027/0138* (2013.01); *G02B 2027/0187* (2013.01)

(58) Field of Classification Search
None
See application file for complete search history.

(56) References Cited

U.S. PATENT DOCUMENTS

| | | | |
|---|---|---|---|
| 6,393,403 B1 * | 5/2002 | Majaniemi | .................... 704/275 |
| 7,526,367 B2 | 4/2009 | Schofield | |
| 7,920,102 B2 * | 4/2011 | Breed | ............................... 345/7 |
| 8,451,108 B2 * | 5/2013 | Kohno et al. | ................... 340/438 |
| 8,893,054 B2 * | 11/2014 | Amento et al. | ................ 715/863 |
| 8,924,150 B2 * | 12/2014 | Tsimhoni et al. | ............. 701/454 |
| 2004/0154040 A1 | 8/2004 | Ellis | |
| 2005/0015805 A1 | 1/2005 | Iwamura | |
| 2005/0102697 A1 | 5/2005 | Vitito | |
| 2006/0288379 A1 | 12/2006 | Vitito | |
| 2008/0027643 A1 * | 1/2008 | Basir et al. | ...................... 701/213 |
| 2008/0249779 A1 * | 10/2008 | Hennecke | ...................... 704/270 |
| 2008/0250462 A1 | 10/2008 | Crohas | |
| 2008/0252798 A1 | 10/2008 | Vitito | |
| 2009/0138920 A1 | 5/2009 | Anandpura | |
| 2010/0005496 A1 | 1/2010 | Ellis | |
| 2010/0304349 A1 | 12/2010 | Kunin | |
| 2011/0106375 A1 | 5/2011 | Gurusamy Sundaram | |
| 2012/0086247 A1 | 4/2012 | Liu | |
| 2012/0233644 A1 | 9/2012 | Rao | |
| 2013/0016209 A1 | 1/2013 | Taylor | |
| 2013/0151111 A1 | 6/2013 | Skelton | |
| 2013/0157647 A1 | 6/2013 | Kolodziej | |
| 2013/0169560 A1 * | 7/2013 | Cederlund et al. | ............. 345/173 |
| 2013/0200991 A1 | 8/2013 | Ricci | |
| 2013/0226369 A1 | 8/2013 | Yorio | |

FOREIGN PATENT DOCUMENTS

GB            2353428        *    2/2001

* cited by examiner

*Primary Examiner* — Vikkram Bali
(74) *Attorney, Agent, or Firm* — Gokalp Bayramoglu

(57) ABSTRACT

The invention is a control and display system. A system can be controlled either by a user's gestures, a remote control or voice control. The image from a rear facing camera can be displayed either on a vehicle's windshield by using a head up display. Alternatively, an image from a camera can be displayed on a head unit, which is located under the vehicle console between a driver seat and a front passenger seat.

8 Claims, 11 Drawing Sheets

CONTROL AND DISPLAY SYSTEM

TECHNICAL FIELD

This invention is related to a display device and its control methods.

BACKGROUND

The in-car infotainment system is defined as a system that provides car information and entertainment and the system has been the common equipment installed in many cars. The in-car infotainment system can be separated into two parts, the rear seat entertainment and the front seat information. Passengers can play games or watch videos using the rear seat entertainment equipment, while a driver can check the information on the windshield by a laser Head Up Display (HUD).

In a typical family, parents usually sit in front seats and children sit in the back seats of a vehicle. During a trip, parents would like to check what their children are doing in the back seat. In order to monitor children sitting in a back seat, parents would need to turn around and look at children to check on them. As a result, a driving parent cannot focus on driving and face a situation where he or she cannot see the road condition while looking at children in a back seat. This in turn may be a cause for an accident.

Rear Seat Entertainment system (RSES) usually incorporates a touch screen wherein a user may enter commands into an RSES by using the touch screen. A kid sitting in the back seat of a vehicle will have hard time reaching to a screen of an RSES. As a result, a kid sitting in the back seat will have hard time playing a game or using RSES by utilizing touch screen as the input means.

SUMMARY OF THE INVENTION

The invention is a control and display system. A system can be controlled either by a user's gestures, a remote control or voice control. The image from a rear facing camera can be displayed either on a vehicle's windshield by using a head up display. Alternatively, an image from a camera can be displayed on a head unit, which is located under the vehicle console between a driver seat and a front passenger seat.

In one embodiment of the invention, a motion detector unit is installed next to the display device. The motion detector unit has a program in it that can follow an algorithm to associate a user's gestures to an application commands. The motion detector detects gestures made by a passenger sitting in a rear seat and the algorithm in a motion detector unit interprets these hand gestures and associates them with plurality of application commands. This way, a user sitting in a rear seat can start an application program and control the operation of the application program by using gestures instead of inputting commands by using control buttons or touch screen.

In another embodiment of the invention the system comprises a display device for displaying the information, a processing unit for executing a program to implement a given algorithm, a sound detecting device and an algorithm for recognizing user's voice to control the operation of the system.

In another embodiment of the invention, the system comprises a display device for displaying the information, a processing unit for executing a program to implement a given algorithm, a remote device which may comprise a handheld device, a smartphone or any device with a display and connected to the system via wires or wireless connection whereas a user can use the remote device to control the operation of the system.

In another embodiment of the invention, the system comprises one or more display devices located in vehicle seat back or in vehicle seat headrest. Each display device comprises a rear seat entertainment camera. The camera captures the image of a person sitting in a rear seat. The image captured by the rear seat camera is sent to a vehicle head up display to be displayed on the windshield. As a result, a driver in the driver seat is able to view a passenger sitting in a rear seat of the vehicle.

In another embodiment of the invention, the system comprises one or more display devices located in vehicle seat back or in vehicle seat headrest. Each display device comprises a rear seat entertainment camera. The camera captures the image of a person sitting in a rear seat. The image captured by the rear seat camera is sent to a vehicle head unit. As a result, a driver in the driver seat is able to view a passenger sitting in a rear seat of the vehicle.

In another embodiment of the invention, the system comprises one or more display devices located in vehicle seat back or in vehicle seat headrest. Each display device comprises a rear seat entertainment camera. Each system also includes a microphone. The system further comprises a remote control wherein a user using the remote control can control the system. This way, a user can either use gestures or voice or a remote control to control the operation of the system. The camera captures the image of a person sitting in a rear seat. The image captured by the rear seat camera is sent to either a vehicle head up display or to a vehicle head unit. As a result, a driver in the driver seat is able to view the rear view of the vehicle including a passenger sitting in a rear seat. This information can be displayed either on head up display or head unit.

DETAILED DESCRIPTION OF THE INVENTION

The Gesture Recognition System comprises at least one display devices and a motion sensor detector.

Figure 1:
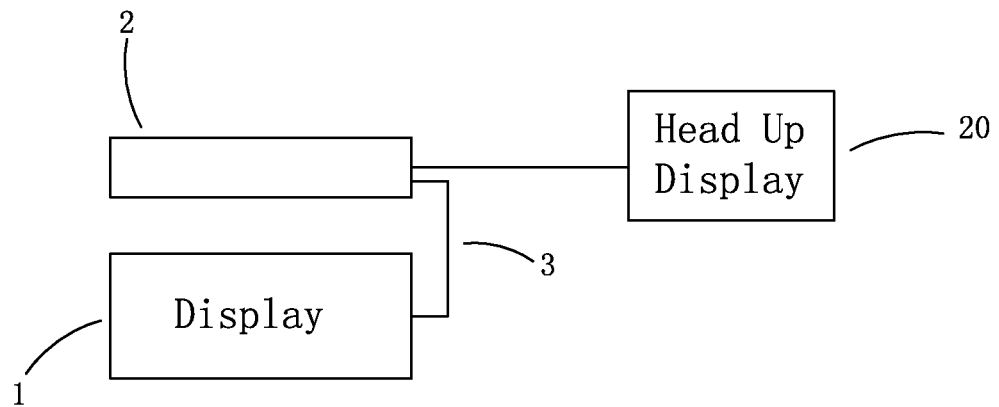
FIG. 1 shows the system configuration where the Display System is shown with a head up display.

FIG. 1 shows the Display System. The Display System comprises sensor unit 2, and display unit 1. Sensor unit 2 comprises sensors that can detect a user's gestures or users voice commands. If the sensor is a motion detector then it can be selected from a group consisting of at least one infrared sensor, at least one camera, at least one heat sensor or any combination thereof. Alternatively the sensor can detect vibration in air created by a user's voice. For example a microphone can be used to detect a user's voice. A signal generated based on gestures or voice detected by the sensor is processed and the result is communicated to display device 1. Sensor unit 2 of FIG. 1 may also include a camera. If a camera is used, a signal generated by the camera is sent to head up display 20. Head up display 20 displays image from camera on windshield of the vehicle.

Figure 2:
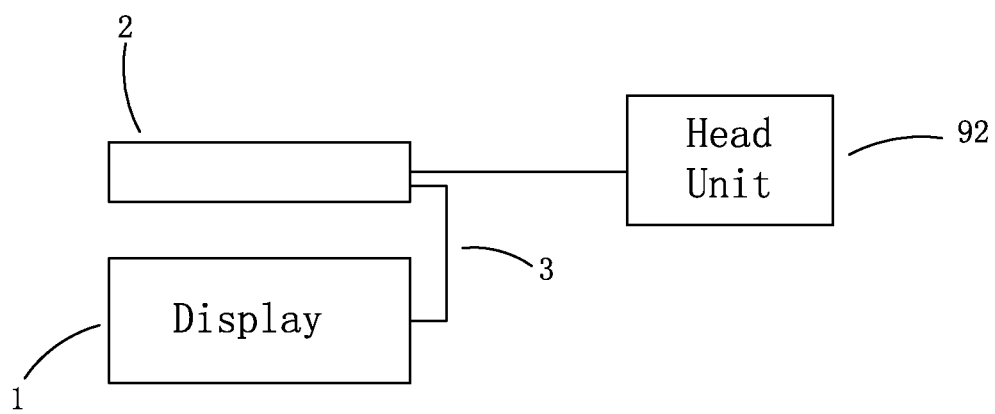
FIG. 2 shows the system configuration where the Display System is shown with a head unit.

FIG. 2 shows another embodiment of the invention. In this embodiment, head up display 20 of FIG. 1 is replaced with the head unit 92. Head unit 92 is placed in front of the car between driver and a passenger and placed in the close proximity of the dashboard of the car. Sensor unit 2 is connected to head unit 92. Sensor unit 2 may include a camera to capture the image of rear seat of the car. The image captured by the camera is sent to head unit 92 to be displayed on head unit 92.

Figure 3:
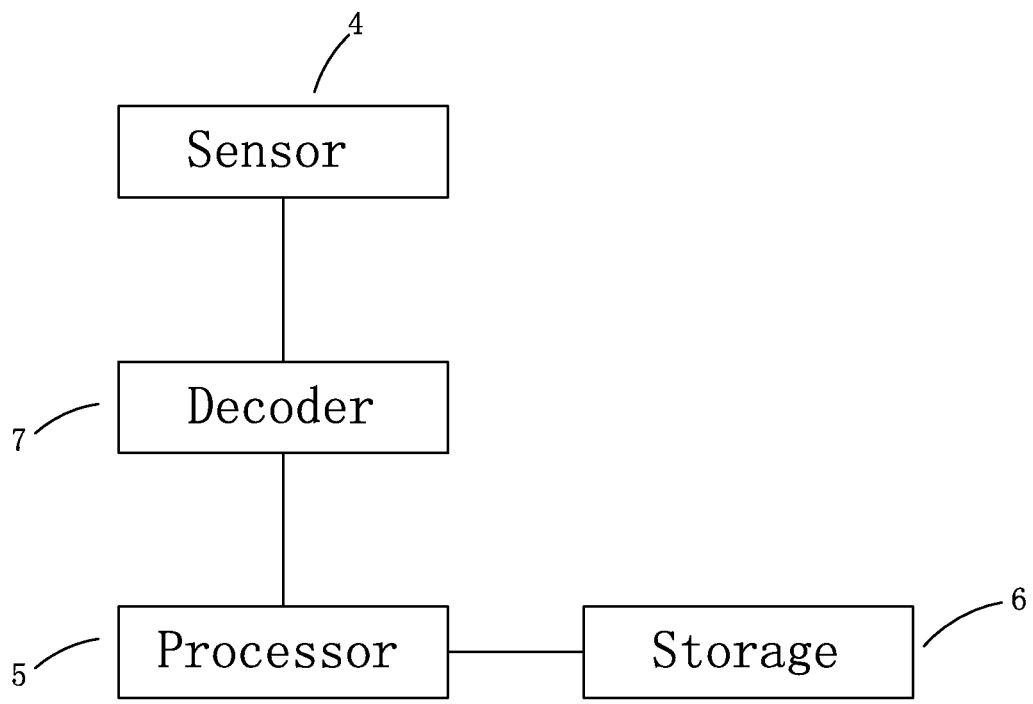
FIG. 3 shows the structure of the sensor unit.

FIG. 3 shows the internal structure of the sensor unit 2. The sensor unit 2 comprises sensor 4, processor unit 5, storage unit 6 and decoder unit 7. Sensor 4 may be a motion sensor or a voice sensor or multiple sensors. If it is a motion sensor, it detects a user's gestures and converts those gestures to signals and those signals are sent to processor unit 5. If sensor 4 is a voice sensor then vibration generated in air by a user's voice is sensed by sensor 4 and the resulting signal is sent to decoder 7. Decoder 7 decodes the signal and converts the signal to a readable information. The output of decoder 7 is connected to the input of processor 5. In yet another embodiment, sensor 4 may include a gesture sensor and voice sensor either combined together or as two separate sensors. In an embodiment where only gesture sensor is used, a user may use his/her hands, feet, head or other means to make gestures to be captured by sensor unit 4. In another embodiment where sensor 4 is a voice sensor, a user can speak words or phrases. These voice signals are captured by sensor 4. In yet another embodiment sensor 4 may include both gesture and voice sensors. In that case both gesture and voice signals are detected by sensor 4 and converted to electrical signals. Once sensor 4 detects a gesture or voice and generates corresponding electrical signal, the electrical signal is sent to decoder 7 to be converted to a readable information and this readable information is sent to processor unit 5. Processor unit 5 stores the gestures and voice in storage unit 6 such that these gestures and voices are compared with the gestures and voices coming from sensor 4. Storage unit 6 has a look up table. If gesture is used then a lookup table generated such that each gesture has a corresponding command in the look up table. If voice is used then a look up table is generated such that each word or phrase has a corresponding command in the look up table. If combination of gestures and voices are used then a look up table for each voice and gesture combination is generated such that each voice and gesture combination corresponds to a command or a list of commands in the look up table. The details of this algorithm will be discussed below. Once the processor unit 5 associates gestures and voices with a command in storage unit 6, processor 5 communicates this result to display unit 1. Display unit 1 displays a proper content of the application being used based on the command coming from the sensor unit 2 as shown in FIG. 1 and FIG. 2.

Figure 4:
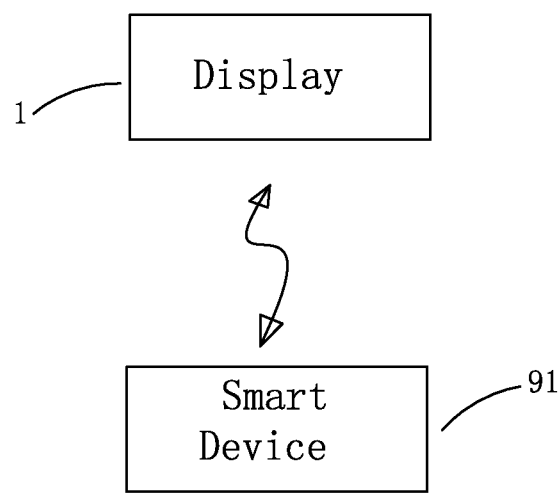
FIG. 4 shows the Display System communicating with a remote control unit

FIG. 4 shows another embodiment of the invention where a smart device 91 is connected to display unit 1 either by using wire or wireless connection.

Figure 5:
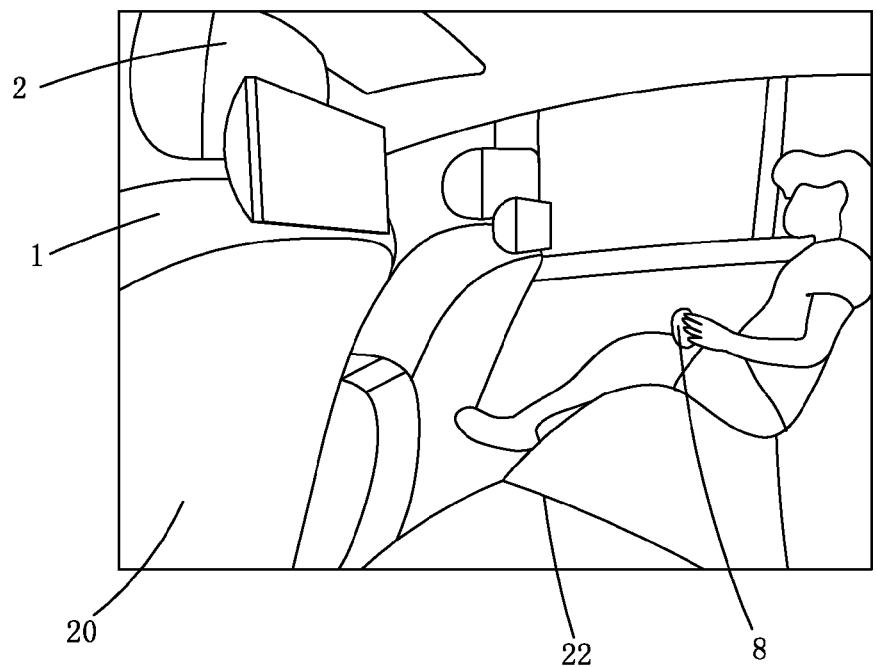
FIG. 5 shows the system configuration with vehicle seat displays and a user sitting in the rear seat and controlling the operation of the system.

FIG. 5 shows an embodiment of the invention wherein display device 1 is installed in the rear section of a vehicle seat. Sensor unit 2 is installed in a rear seat next to display device 1. Although display device 1 and sensor unit 2 are shown separately, it is possible to combine display device 1 and sensor unit 2 to make a single unit. A user sitting in a rear seat has controller 8 to control the operation of display device 1. Sensor unit 2 can be a motion sensor in which case user gestures are captured and interpreted to determine what command the user is trying to implement. Sensor unit 2 can be a voice sensor in which case user voice is captured by sensor unit 2 and interpreted to determine what command the user is trying to implement. Sensor unit 2 can be a combination of motion sensor and voice sensor in which case both gesture and voice of a user are captured and interpreted to determine which command the user wants to implement. In one embodiment, sensor unit 2 has a camera along with sensors. The camera captures the image in its view which includes rear seat 22 and passenger 8 sitting in rear seat 22. The camera sends captured image to either head up display or head unit. In yet another embodiment, both head up display and head unit are used. In another embodiment, sensor unit 2 also includes a camera. This way sensor unit 2 has motion sensor and a camera. Motion sensor and camera can be a combined unit or separate units. In yet another embodiment, a camera is used both as an image capturing device and motion detector sensor. In another embodiment camera and sensor for voice detection are used. In that case the camera captures rear seat 22 image and passenger sitting in rear seat 22 and a user's voice is detected and interpreted by sensor unit 2.

In another embodiment, sensor unit 2 includes both voice and motion sensors. Motion and voice sensors detect the user's motion and voice commands and interpret them in combination to determine which command the user wants to implement. A voice command can enforce a motion command and they can complement each other.

Figure 6:
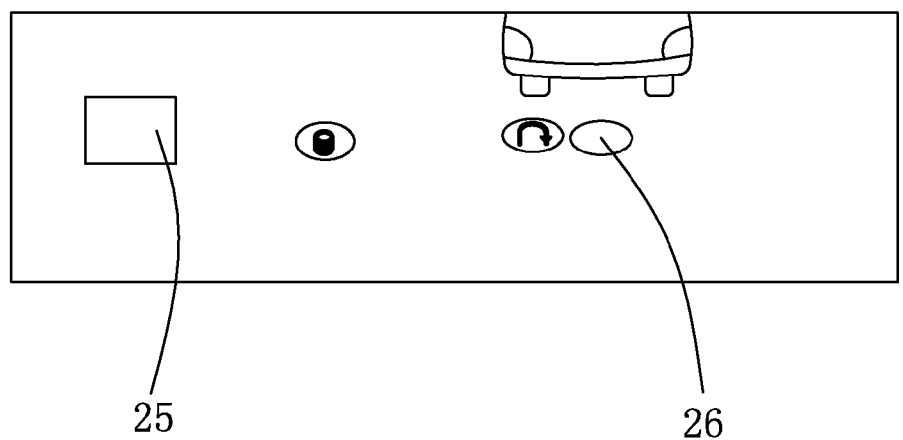
FIG. 6 shows the head up display wherein vehicle information is displayed on vehicle's windshield along with the image from the rear view camera showing a passenger sitting in a rear seat of the vehicle.

FIG. 6 shows a set up where an image of passenger and the car information of a car are displayed on a windshield of a vehicle by using head up display. The windshield has image 25 and other vehicle information 26 on it. Image 25 comes from camera to head up display 20 and displayed on vehicle's windshield. Alternatively the image can be displayed on head unit. This way a driver can see image 25 of a passenger sitting in a rear seat.

Figure 7:
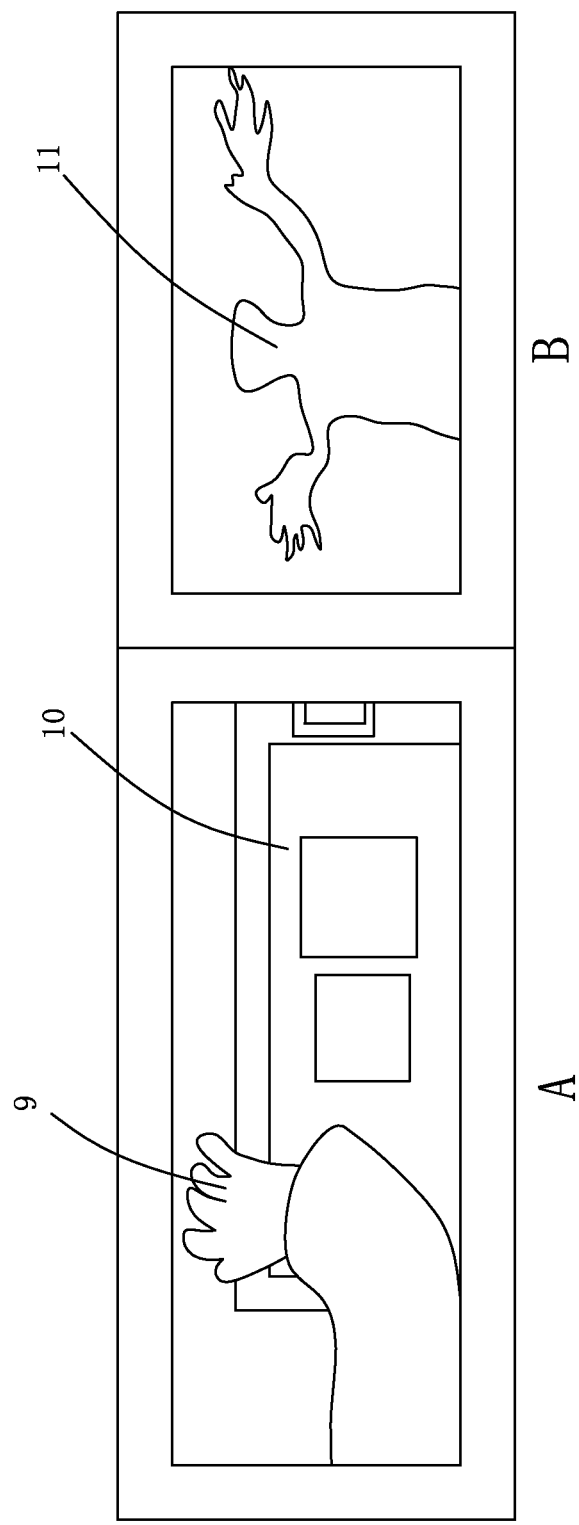
FIG. 7 shows the Display System using hand recognition sensor.

FIG. 7A shows an embodiment of the invention where user 9 uses his/her hands to control the operation of system 10. System 10 may include a sensor unit and RSES. Alternatively, system 10 may have an RSES that can include a sensor unit. FIG. 7B shows another user 11 using both of her/his hands to control the operation of system 10.

Figure 8:
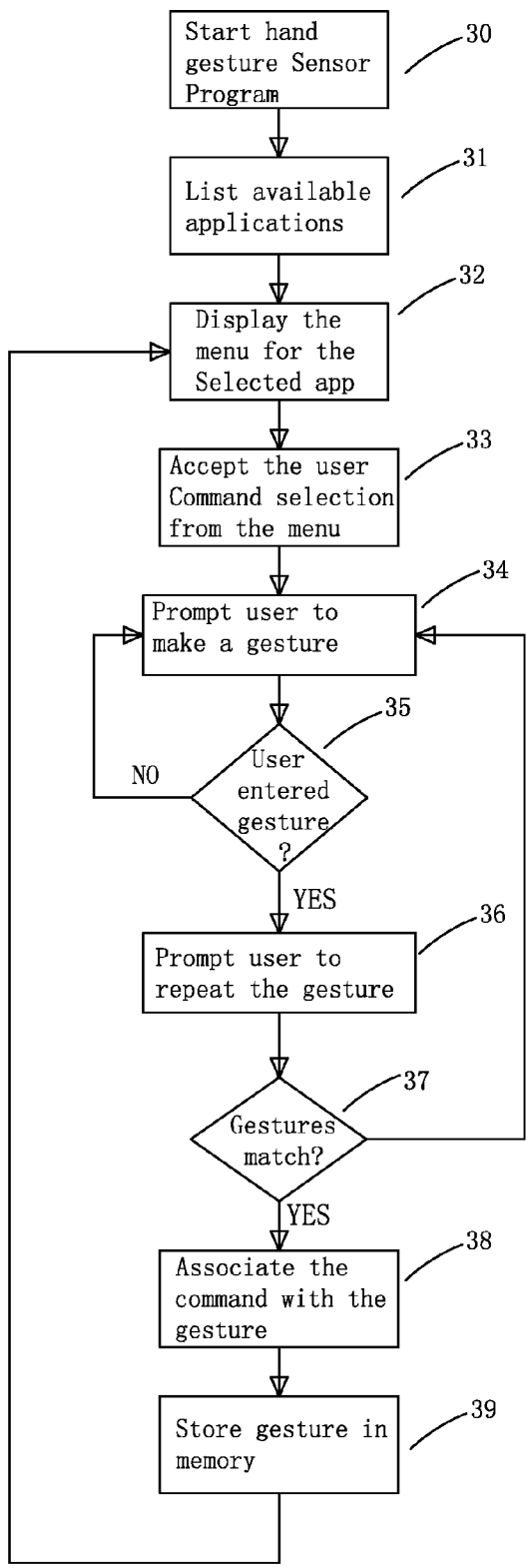
FIG. 8 shows the algorithm to create a look up table for controlling the display device by using gestures.

FIG. 8 shows the algorithm to create a look up table to associate user gestures with commands. The algorithm in FIG. 8 is used to store gestures entered by a user. These gestures are stored in a storage device and used in a later time to determine a corresponding application command based on a user's gesture captured by the sensor. The algorithm in FIG.

5 starts at step 30 by user selecting to start the sensor application. When the application starts, all other available application programs in the system are listed on display device 1. This is accomplished in step 31. In step 32, the menu bar for the selected application program is displayed on display device 1. The user is prompted to select a command from the menu of the application program. In step 33, the user's selection of command is accepted and stored in a storage device. In step 34, algorithm prompts the user to make a gesture that the user wants to associate with the command selected in step 33. In step 35 the system checks if the user enters a gesture. If so, then the system prompts the user to repeat the gesture in step 36. If the user does not enter a gesture in step 35 then the system goes back to step 34 and prompts the user to enter a gesture. If the user enters a repeat gesture in step 36, then the system progresses to step 37 to check if the repeat gesture matches to earlier entered gesture. If there is a match then in step 38 the system associates the gesture with the command entered in step 33. This association of gesture in step 36 with the command in step 33 is stored in storage device to be used later.

Figure 9:
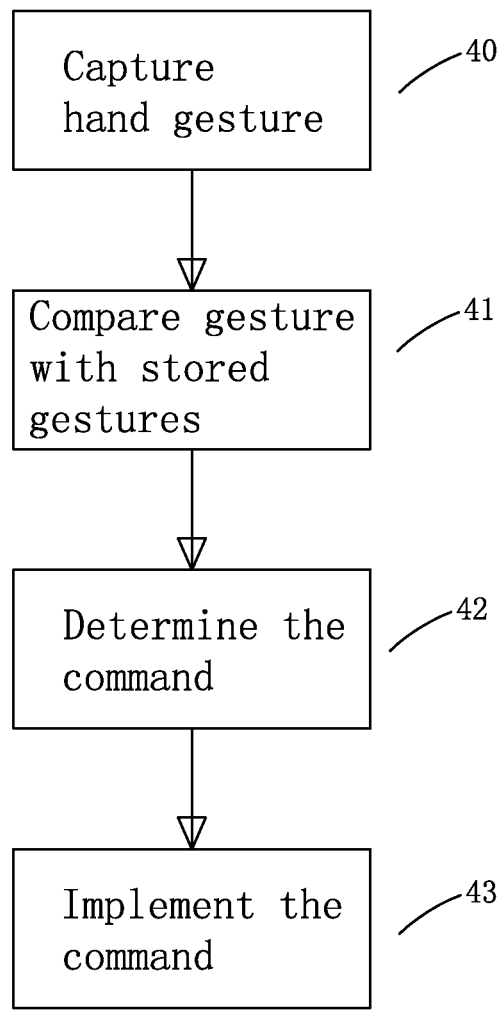
FIG. 9 shows the algorithm to control the display device by using gestures.

FIG. 9 shows an algorithm to recognize a user's gestures and implement commands based on a user's gestures. In step 40, the sensor detects gestures. As discussed previously, sensor unit 2 has a storage unit 6, where a look up table showing corresponding command for each gesture is stored. In step 41, gestures made by user are compared with gestures stored in storage unit 6. In step 42 the command is determined based on the comparison of gesture with stored gestures. In step 43, once the command is determined, the command is executed.

While these embodiments discuss sensor unit 2 as being used in a vehicle, it should be understood that sensor unit 2 and the method disclosed here could be used in any set up. For example sensor unit 2 can be a system used at home. In another example sensor unit 2 can be used in an office.

Figure 10:
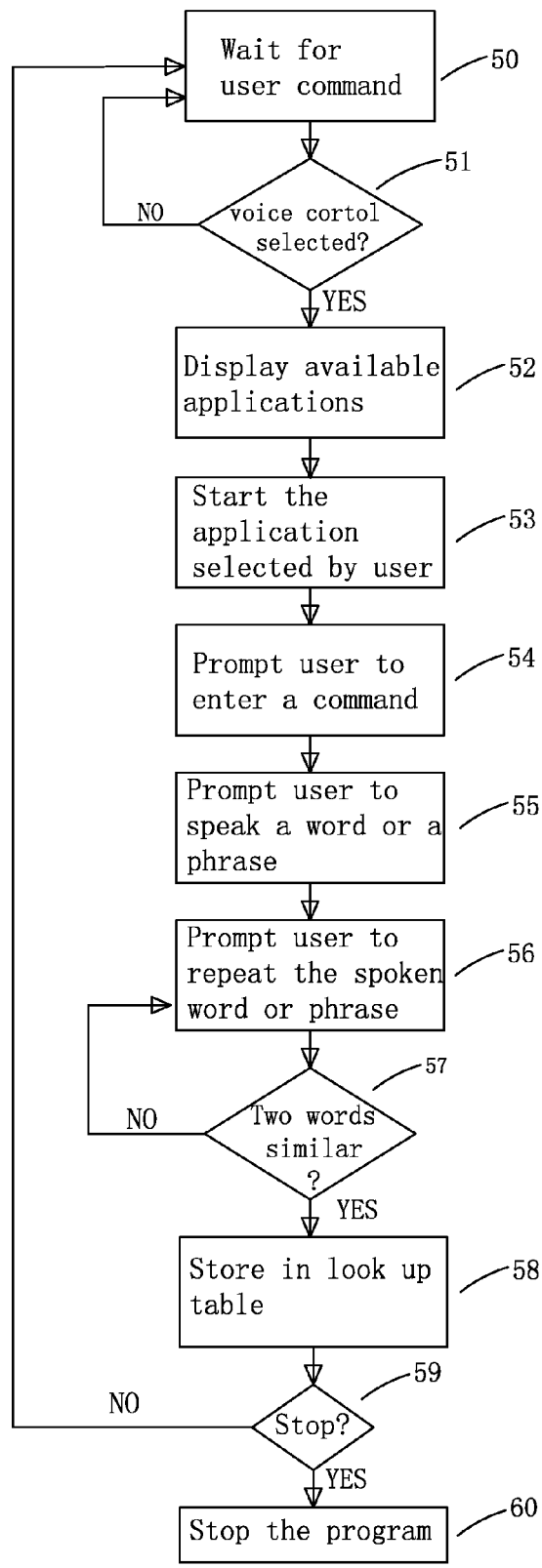
FIG. 10 shows the algorithm to create a look up table for controlling the display device by voice.

FIG. 10 shows an algorithm to create a look up table for voice commands. In step 50, the system waits for the user command. In step 51 the system checks if the user wants to start voice control program. If the user wants to start voice control program then in step 52, the system displays available applications that can be controlled by voice. In step 53, the system starts the application selected by the user. In step 54, the system prompts the user to enter a command for the selected program. In step 55, the system prompts the user to speak a word or phrase that the user wants to associate with the command selected in step 54. In step 56, the system asks the user to repeat the spoken word or phrase that the user wants to associate with the command selected in step 54. In step 57, the system checks if the user words or phrases in step 55 and step 56 match. If there is a match, in step 58, the words or phrase associated with the command of step 54 and stored in a look up table. If there is no match in step 57, then the system goes back to step 55 and prompts the user to speak a word or phrase. In step 59 the system checks if the user wants to stop the program. If the user wants to stop the program then the algorithm is stopped in step 60. If the user wants to continue the program then the system goes back to step 50 to wait for the user command.

Figure 11:
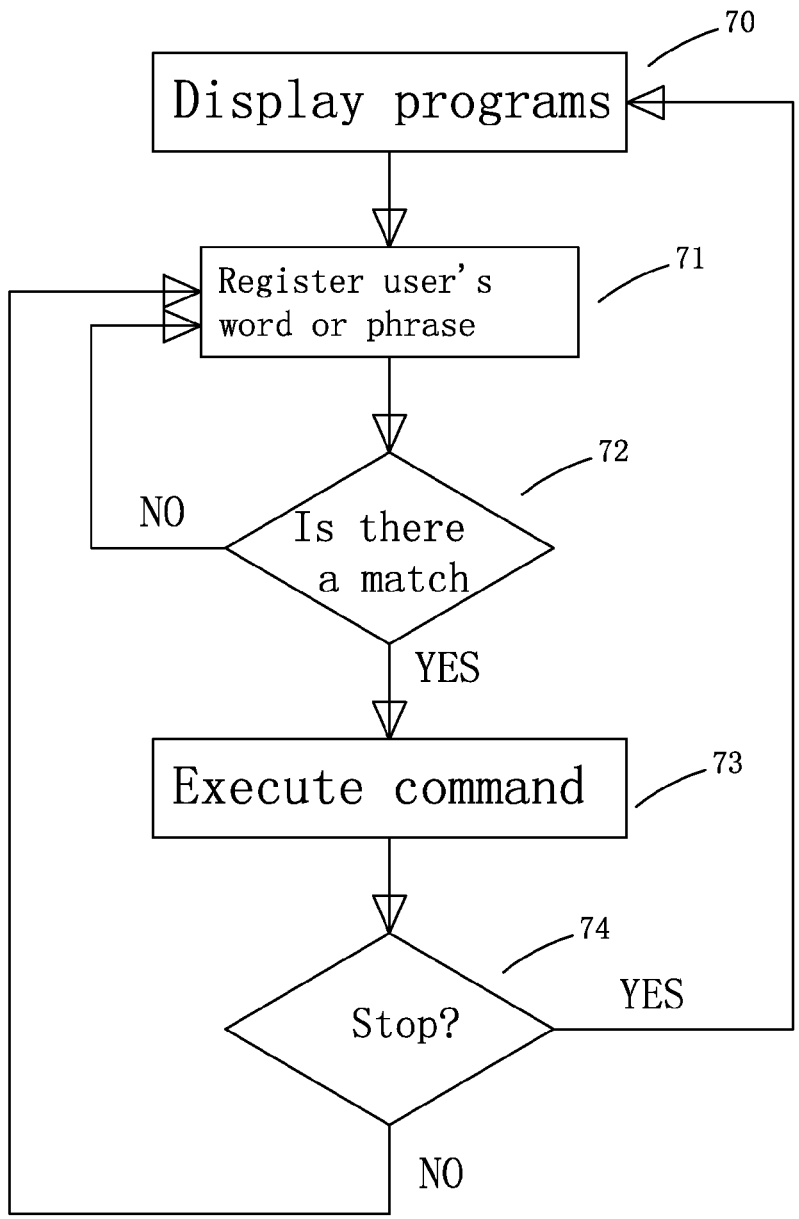
FIG. 11 shows the algorithm to control the display device by using voice

FIG. 11 shows the algorithm where the user's spoken words or phrases are recognized and corresponding commands are executed by the system. In step 70, the system displays the program selected by the user. In step 71 the user speaks a word or phrase. In step 72, the system checks the look up table to match the word or phrase to another word or phrase in the look up table. If there is a match then the command that corresponds to the word or phrase is executed. If there is no match then the system goes back to step 71 to wait for the user's next word or phrase. The match discussed here can be an exact match or a similar word or phrase. A word or phrase that is close to a word or phrase stored in the look up table can be considered to be close enough to execute the corresponding command. The person who designs the system determines the threshold of the similarity and the threshold is set up in the algorithm. In step 74, the system checks if the user wants to stop the algorithm. If the user wants to stop then the system moves to step 70. If the user does not want to stop then the system moves to step 71.

Figure 12:
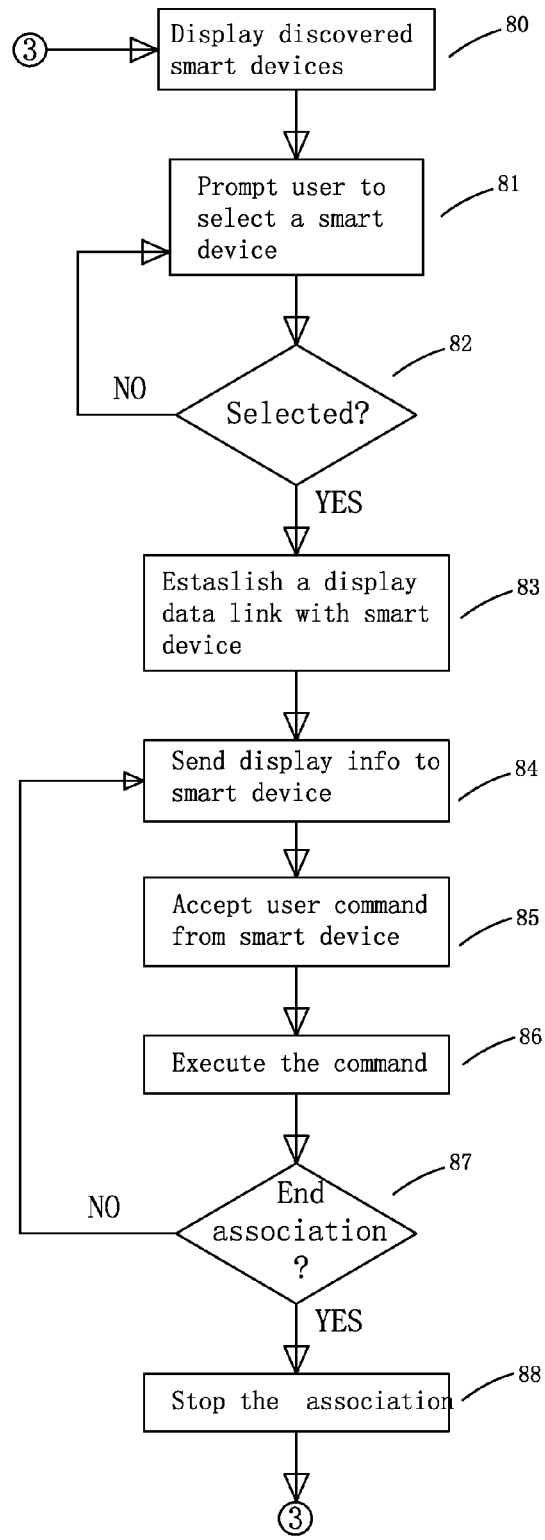
FIG. 12 shows the algorithm to associate a smart device with the display system and control of the display system using a smart device

FIG. 12 shows the algorithm of associating smart devices with the system and using smart devices to issue commands to the system. In step 80, the system discovers existing smart devices and displays a list of smart devices on the display device. In step 81 the system prompts user to select a smart device from the list presented in step 80. In step 82 the system check if the user selected a smart device or not. If the user does not select a smart device then the system goes back to step 81 and prompts user to select a smart device. Once the user selects a smart device from the list, and then in step 83, the system establishes a display data link with the selected smart device. In step 84, the system sends display info to selected smart device. This way whatever is displayed on the display device is also displayed on the selected smart device. In step 85 the system accepts commands from selected smart device. In step 86, the system executes the command received from the smart device in step 85. In step 87, the system checks if the user wants to stop the association of the smart device with the system. If the user wants to stop the association of the smart device with the system then the system goes to step 88 and stops the association. Then the system goes back to step 80 and displays a list of smart devices on the display device. In step 87, if the user wants to continue to associate the smart device with the system then the system goes back to step 84 and the system sends display info to selected smart device.

Figure 13:
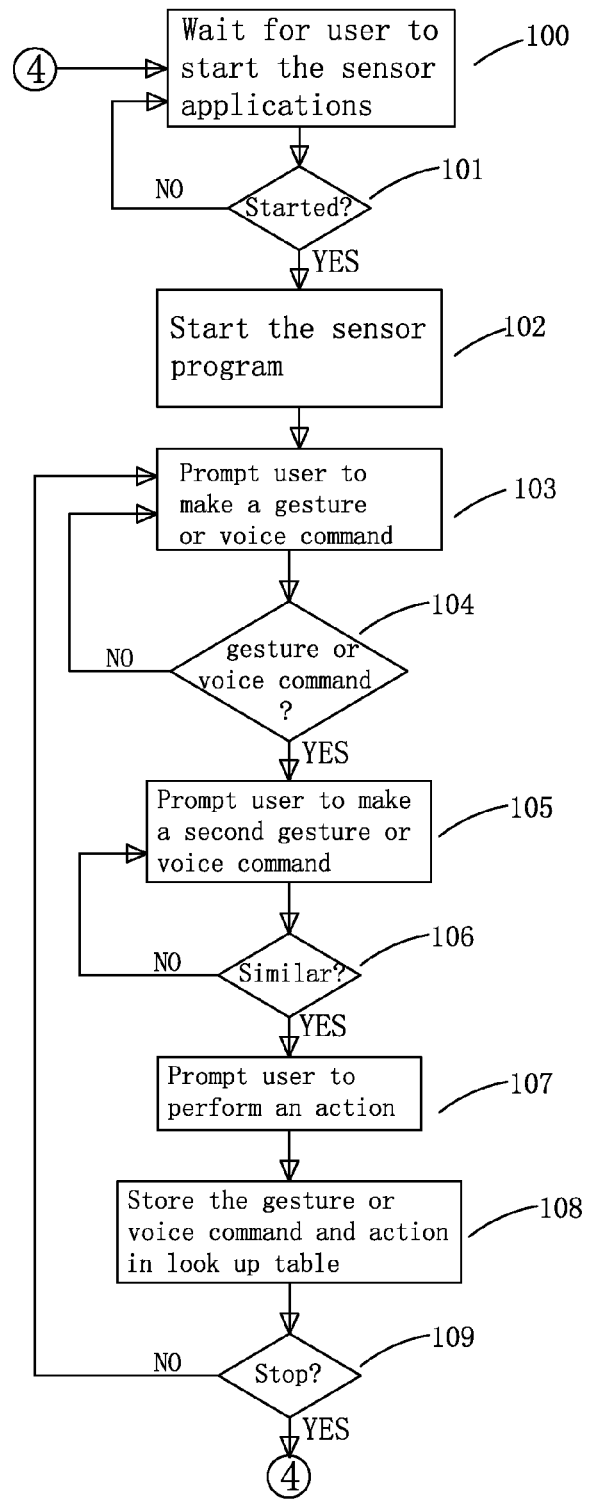
FIG. 13 shows an algorithm to create a look up table for controlling the display device by a gesture or a voice command

FIG. 13 shows the algorithm for creating a look up table wherein the look up table contains gestures or voice commands and corresponding actions. These actions can be application specific and entered into the display device during the generation of the look up table. In step 100 the system waits for a user to start the sensor application. If the sensor application is started by a user then the system moves to step 101. Otherwise the system waits for a user to start the sensor program in step 100. If a user wants to start the sensor program then the system starts the sensor program in step 102. In an alternative embodiment the sensor program can start automatically when the RSES is turned on. The sensor program can accept gestures or voice commands from a user or multiple users. A voice command is defined as a spoken word or a spoken phrase. A user can enter a gesture, a voice command or a combination of gesture and voice command. When the sensor program is started in step 101, the system moves into step 103 and the user is prompted to either make a first gesture or a first voice command. It is also possible for a user to make a first gesture and a first voice command while making a gesture. Therefore either a first gesture or a first voice command or a combination of a first gestures and a first voice command can be used. In step 104, the system checks if the user enters a first gesture or a first voice command or a combination of a first gesture and a first voice command. If there is not a first gesture or a first voice command or a combination of a first gesture and a first voice command then the system moves to step 103 to prompt the user to enter a first gesture or a first voice command or a combination of a first gesture and a first voice command. Once a first gesture or a first voice command or a combination of these is detected, the system asks the user to make a second gesture or a second voice command or a combination of any of a second gesture and a second voice command. This is accomplished in step 105. If the user makes a second gesture or a second voice command or any combination of any of these then the system checks to see if the second gesture or the second voice command or the combination thereof is similar to the first gesture or the first voice command. This is accomplished in step 106. If the second gesture is similar to the first gesture then the system moves to step 107. Likewise if the second voice command is similar to the first voice command then the system moves to step 107. If the combination of the second gesture and the second voice command is similar to the first combination of the first gesture and the first voice command then the system moves to step 107. In step 107, the system prompts user to perform an action. An action is defined as any control of an application program. A user performing different acts performs this control. For example an action can be starting an application and/or performing a command within the application. For example the application may be a flash light application for a handheld device. When the system is in step 107 and when a user is prompted to perform an action, a user can start the flash light application and perform the act to increase the handheld device brightness by dragging a finger on the touch screen of the device. Once this act is performed, it will be saved on the look up table as a corresponding action for the previously captured gesture or voice command or a combination of the previously captured gesture or voice command. This is accomplished in step 108. After the entry into the look up table, in step 109, the system checks if the user wants to stop the program or not. If the user wants to stop then the system goes back to step 100 to wait for the user command to start the sensor program. If the user wants to continue in step 109 then the system goes back to step 103 where the system prompts the user to make a gesture or a voice command or a combination of a gesture and a voice command.

Figure 14:
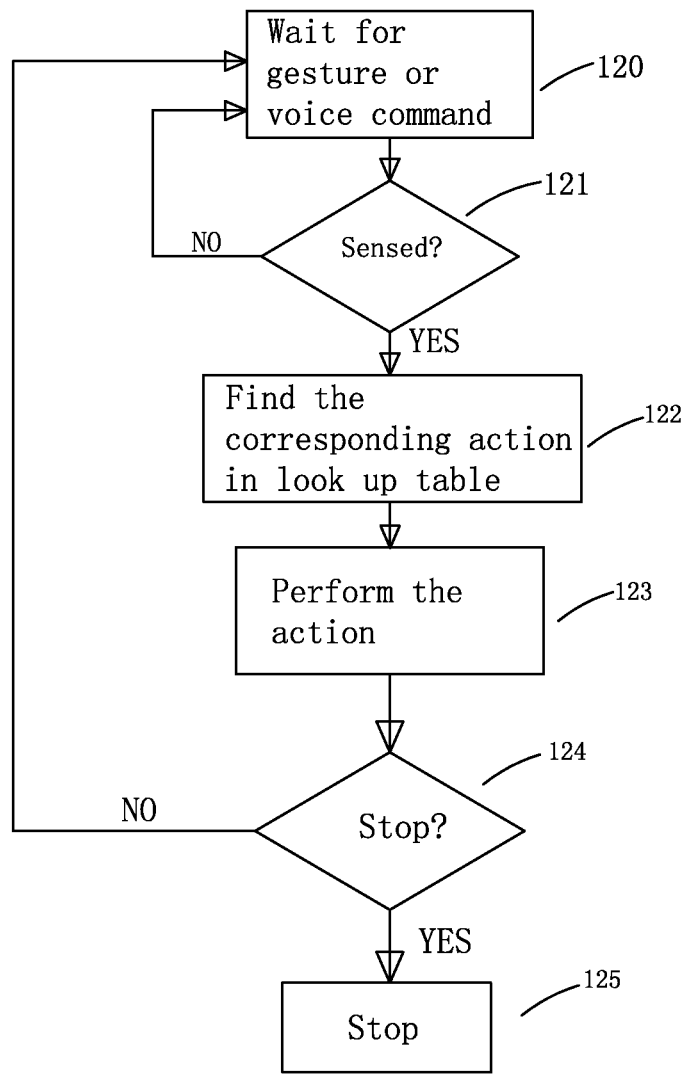
FIG. 14 shows the an algorithm to control the operation of a display device by a gesture or a voice command

FIG. 14 shows the algorithm where a user can make a gesture, or voice command or makes a gesture and a voice command in combination to perform predetermined actions stored in the look up table that is generated by the algorithm described in FIG. 13. In FIG. 14, in step 120 the system waits for a gesture or a voice command or a combination of these. In step 121, the system checks if a gesture or a voice command or a combination of these detected. If not detected, then the system goes back to step 120. If detected the system goes to step 122 where the system compares the gesture or the voice command or a combination of these with the gesture or the voice command or a combination of these stored in the look up table. Once a similarity is detected in step 122, and then the system performs the action in step 123. If there is no similarity then the system does not perform any action. In step 124, the system checks to find out if the user wants to stop the sensor program. If the user wants to stop the sensor program then the system stops and no gesture or voice command will be recognized. If the user wants to continue to use gestures or voice command to control the monitor device then the system moves to step 120 and waits for the next gesture or the next voice command or the combination thereof.

An example for application of the algorithm described in FIG. 13 and FIG. 14 is presented. In this example a flashlight application can be controlled with a user by using gestures or voice command or the combination thereof. First, a look up table generated by using an algorithm similar to the algorithm presented in FIG. 13. A user starts the sensor program and user enters gestures or voice command. Then the system prompts user to enter a second gesture or a second voice command. If the first gesture and the second gesture are similar or if the first voice command and the second voice command are similar or if the first voice command and the second voice command are similar then the system prompts user to perform an action so that the action can be associated with the gesture or voice command or the combination thereof. Once prompted, the user starts the flash light program and then in the program, the user increases the brightness of the screen by touching the screen and moving the cursor in the direction that increases the brightness of the screen. Once the action is completed, the system saves this action in the look up table. Once the creation of the look up table is completed and once the system starts the operation, when user enters corresponding gesture or voice command or a combination thereof, the system will start the flashlight program and increase the brightness for an amount that was captured during the generation of the look up table. As one having ordinary skill in the art would appreciate, there can be numerous numbers of actions and all of the actions can be detected and stored in a look up table by the system. Each application may have its unique way of implementation and all these actions can be characterized and stored in a look up table so that user can control the system by gestures or voice commands or a combination thereof. The control mechanism is not limited to gestures or voice command or a combination of thereof. A user can provide any input that can be sensed by the system and can be used to identify the corresponding action.

Some commands are applicable to the RSES itself and are not applicable to any application on the RSES. These commands include but not limited to: brightness up, brightness down, volume up, volume down, power on, power off, put in standby mode, Wi-Fi on, Wi-Fi off, screen on, screen off, bluetooth on and bluetooth off. Many more actions that are specific to different RSES can be added to this list.

In yet another embodiment of the invention a sensor application program has predefined gesture recognition. Predefined gesture recognition means the display device has certain set of gestures and corresponding actions stored in the display device. As a result, the display device performs actions based on captured gestures. A user can make gestures in front of a display device and the display device can recognize the user's gestures. For example the user can make a first in front of the display device to indicate that the user wants to move the cursor on the screen. As the user moves the first in a given direction, the cursor on the screen also moves in the same direction. If the user opens the first at any location, the sensor application program interprets it as a mouse click at the location where the user opens the fist. If the user closes the first then the sensor application program interprets it as releasing the mouse button. Many different gestures can be preprogrammed in sensor application program in the display device.

In an example of the system implementation, RSES system is installed within a vehicle. A user turns on the RSES with voice, hand gesture, or manually. User says "map on" and a map application starts. The user says "show my location". The map application program uses GPS (global positioning system) device to find the user's location and centers the map on the user's location and display's on the display device.

An example of predetermined gesture recognition is a set up where a user starts sensor application program and the user moves his/her first to the location where an application program icon resides on the screen. When the user opens his/her first at that location, indicating a mouse click at that location, the application program starts running. Then when the user moves his/her first to "start program" location and open his/her fist, the application program starts. In one example the application program is a game and the user can open his/her first to indicate that the user wants to stretch a string of the catapult with the bird on it. The user can move his/her palm to indicate how far the user is stretching the string of the catapult. When the user closes his/her fist, corresponding to mouse release action, the action is interpreted as to catapult the bird. The game continues until the user selects "end session" option in sensor application program in which case sensor application program no longer interprets gestures.

The predetermined gesture set can be loaded into the display device and can be changed by the user.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention.

I claim:

1. A method of creating a look up table in the storage unit of a display system, wherein the display system comprises at least one sensor, a decoder, a processor, a storage unit, at least one display device; wherein the sensor is connected to the decoder and the decoder is connected to the processor and the processor is connected to the storage unit; wherein the sensor captures an input from a user and controls the operation of the display device based on the input from the user; wherein the display device is located in vehicle seat back or in vehicle seat headrest; and wherein one of the sensors is a motion detection sensor and the input from the user is a motion; and the method comprising:
    starting a gesture sensor program;
    listing available applications;
    displaying a menu for a selected application;
    accepting a user command selection from the menu;
    prompting the user to make a first gesture;
    checking to find out if the user entered the first gesture or not;
    prompting the user to enter a second gesture if the user entered the first gesture;
    prompting the user to enter the first gesture if the user does not enter the first gesture;
    comparing the second gesture and the first gesture if the user enters the second gesture;
    associating the first gesture with the command if the first gesture and the second gesture are substantially similar; and
    storing the first gesture and the corresponding command in a look up table in the storage unit.

2. The method of claim 1, wherein the first gesture is selected from a group consisting of hand gestures, feet gestures, head gestures, body gestures and a combination of hand, feet, head and body gestures; and
    wherein the second gesture is selected from a group consisting of hand gestures, feet gestures, head gestures, body gestures and a combination of hand, feet, head and body gestures.

3. A method of creating a look up table in the storage unit of a display system, wherein the display system comprises at least one sensor, a decoder, a processor, a storage unit, at least one display device; wherein the sensor is connected to the decoder and the decoder is connected to the processor and the processor is connected to the storage unit; wherein the sensor captures an input from a user and controls the operation of the display device based on the input from the user; wherein the display device is located in vehicle seat back or in vehicle seat headrest; wherein one of the sensors is a voice detection sensor and the input from the user is a word or a phrase or a combination of the word and the phrase; the method comprising:
    starting a voice sensor program;
    listing available applications;
    displaying a menu for a selected application;
    accepting a user command selection from the menu;
    prompting the user to speak a first voice command;
    checking to find out if the user speaks the first voice command;
    prompting the user to enter a second voice command if the user entered the first voice command;
    prompting the user to speak the first voice command if the user does not enter the first voice command;
    comparing the second voice command with the first voice command if the user speaks the second voice command;
    associating the first voice command with the user command if the first voice command and the second voice command are substantially similar;
    storing the first voice command and the corresponding user command in a look up table in the storage unit.

4. The method of claim 3 wherein the voice command is selected from a group consisting of a spoken word, a spoken phrase, and a combination of a spoken word and a spoken phrase.

5. A method of creating a look up table in the storage unit of a display system, wherein the display system comprises at least one sensor, a decoder, a processor, a storage unit, at least one display device; wherein the sensor is connected to the decoder and the decoder is connected to the processor and the processor is connected to the storage unit; wherein the sensor captures an input from a user and controls the operation of the display device based on the input from the user; wherein the display device is located in vehicle seat back or in vehicle seat headrest; and wherein one of the sensors is a motion detection sensor and the input from the user is a motion; and the method comprising:
    starting a gesture sensor program;
    prompting the user to make a first gesture;
    checking to find out if the user entered the first gesture or not;
    prompting the user to enter a second gesture if the user entered the first gesture;
    prompting the user to enter the first gesture if the user does not enter the first gesture;
    prompting the user to perform an action;
    comparing the second gesture and the first gesture if the user enters the second gesture;
    associating the first gesture with the action if the first gesture and the second gesture are substantially similar; and
    storing the first gesture and the corresponding action in a look up table in the storage unit.

6. The method of claim 5 wherein the first gesture is selected from a group consisting of hand gestures, feet gestures, head gestures, body gestures and a combination of hand, feet, head and body gestures; and
    wherein the second gesture is selected from a group consisting of hand gestures, feet gestures, head gestures, body gestures and a combination of hand, feet, head and body gestures.

7. A method of creating a look up table in the storage unit of a display system, wherein the display system comprises at least one sensor, a decoder, a processor, a storage unit, at least one display device; wherein the sensor is connected to the decoder and the decoder is connected to the processor and the processor is connected to the storage unit; wherein the sensor captures an input from a user and controls the operation of the display device based on the input from the user; wherein the display device is located in vehicle seat back or in vehicle seat headrest; and wherein one of the sensors is a voice detection sensor and the input from the user is a word or a phrase or a combination of the word and the phrase; the method comprising:

starting a voice command program;
prompting the user to speak a first voice command;
checking to find out if the user spoken the first voice command or not;
prompting the user to speak a second voice command if the user spoken the first voice command;
prompting the user to speak the first voice command if the user does not speak the first voice command;
prompting the user to perform an action;
comparing the second voice command and the first voice command if the user enters the second voice command;
associating the first voice command with the action if the first voice command and the second voice command are substantially similar; and
storing the first voice command and the corresponding action in a look up table in the storage runt.

8. The method of claim 7 wherein the voice command is selected from a group consisting of a spoken word, a spoken phrase, and a combination of a spoken word and a spoken phrase.

* * * * *